Feb. 3, 1959 W. A. BEDFORD, JR 2,872,139
FASTENING DEVICE
Filed Oct. 21, 1953
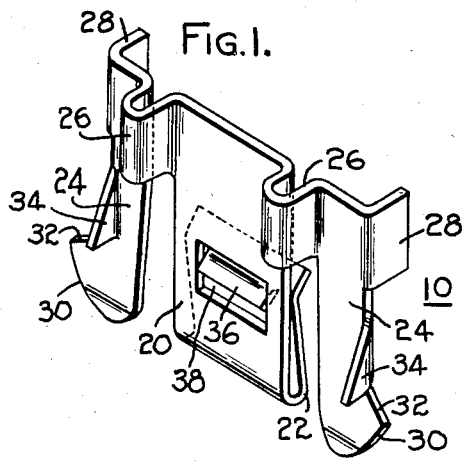
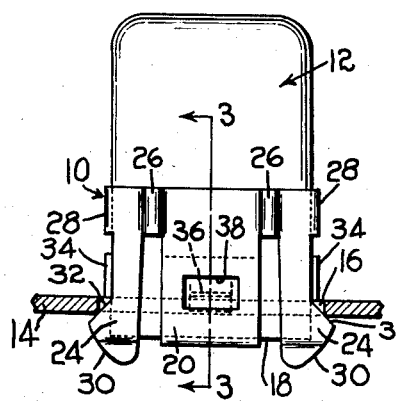
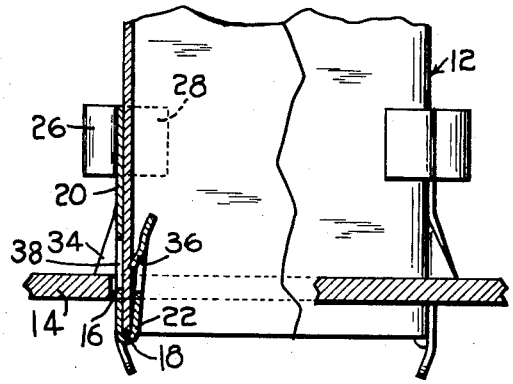
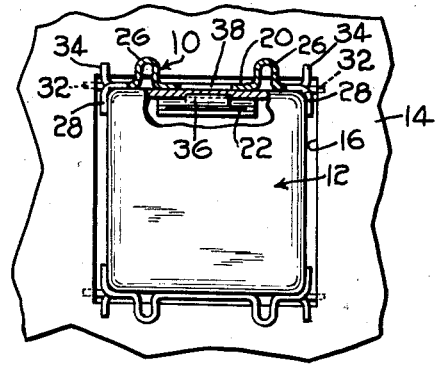
INVENTOR:
WILLIAM A. BEDFORD JR.
BY Robert E Ross
ATTORNEY.

United States Patent Office 2,872,139
Patented Feb. 3, 1959

2,872,139

FASTENING DEVICE

William A. Bedford, Jr., North Scituate, Mass.

Application October 21, 1953, Serial No. 387,395

2 Claims. (Cl. 248—27)

This invention relates generally to fastening devices and has particular reference to a fastening device for securing a radio shield can to a supporting panel.

In the construction of radios, television sets, and other electronic apparatus, it is necessary that certain small coils be shielded from external magnetic fields, and in some cases the field produced by the coil must be shielded to prevent it from affecting other parts of the apparatus. It has been customary to simply mount a metal can over the coil, which seats on the chassis or support panel, so that magnetic fields are intercepted by the metal can and grounded to the chassis. Many types of fastening devices have been used for the purpose of attaching the can to the shield, however, each has some disadvantage, either being too expensive, too difficult to assemble and remove, or does not retain the shield tightly against the panel.

The object of the invention is to provide a fastener for attaching a radio shield can or the like to a support panel, which overcomes the above disadvantages in that it is economical to manufacture, easy to assemble, and retains the can in such a manner that adequate shielding is provided.

A further object of the invention is to provide a shield can fastener which permits the bottom end of a shield can to protrude through a panel opening to provide effective shielding.

Other objects of the invention will, in part, be obvious, and will, in part, appear hereinafter.

In the drawing:

Fig. 1 is a perspective view of a fastening device embodying the features of the invention.

Fig. 2 is a side view of a shield can assembly utilizing the fastener of Fig. 1.

Fig. 3 is a view in section taken on line 3—3 of Fig. 2.

Fig. 4 is a top plan view, partly broken away, of the fastener assembly of Fig. 2.

Referring to the drawing, there is illustrated a fastening device 10, which is particularly adapted for attaching a shield can 12 or the like to a support panel 14.

In the illustrated embodiment, the support panel 14 is provided with an aperture 16 which is substantially square. The shield can 12 is also substantially square, being slightly smaller than the opening 16, and has an open lower end to receive electronic apparatus (not shown), providing side edges 18 at the lower end of the can.

The fastener 10 is preferably formed of a single piece of resilient sheet metal and comprises generally a body portion 20 lying superimposed on one side of the can, a reverse bend portion 22 at the lower end of the body portion, to form a clip for attachment to a side edge 18 at the bottom of the can, and a pair of legs 24 attached to the upper end of the body portion and extending downwardly alongside the body in spaced relation thereto.

The body portion 20 and the legs 24 are substantially flat, lying in approximately the same plane, and are joined at the upper portion of the body by a U-shaped portion 26 which projects outwardly from the plane of the body and the arms, thereby permitting the legs to flex toward and away from the body portion.

To properly position the fastener 10 in relation to the can, the upper end of the fastener is provided with tabs 28 which are bent back out of the plane of the body portion to be disposed against the two opposite sides of the can adjacent the side against which the body is superimposed, thereby preventing lateral movement of the fastener in relation to the can.

To provide means for engaging the panel, the outer edges of the legs are provided with inclined edge portions 30 at the ends which lead to shoulders 32, and tongs 34 project from the plane of the arms above the shoulders to provide stop means as will appear hereinafter.

The reverse bend portion 22 of the clip is provided with an inclined tongue 36 protruding therefrom for biting into the inner surface of the side of the can, and the opposite portion of the body portion 20 is provided with an aperture 38 into which the tongue 36 protrudes prior to assembly, so that the reverse bend portion 22 is initially as close to the body portion as possible, so that after assembly, the clip will grip the can as tightly as possible.

The fastener is initially assembled onto the can by inserting the clip over the lower edge of one side of the can and pushing it upwardly until the edge of the can seats against the junction of the reverse bend portion 22 and the body, with the tongue frictionally gripping the inner surface of the can to retain the fastener in position. During this portion of the assembly the fastener is aligned laterally on the can by the positioning tabs 28.

After an identical fastener has been assembled onto the opposite side of the can, the can may be assembled onto the panel by inserting the legs of the fastener into the opening and pushing the can downwardly through the opening. The legs thereby flex inwardly until the shoulders 32 snap past opposite edges of the panel opening, and the tongs 34 flat against the upper side of the panel, preventing further downward movement. The can is thereby securely retained in the panel opening, with the lower end of the can projecting through the panel to provide excellent shielding.

The can may also be easily removed from the panel by squeezing the pairs of legs together with a suitable tool, to permit the legs to pass upwardly through the opening.

Since certain obvious changes may be made in the device without departing from the scope of the invention, it is intended that all matter contained herein be interpreted in an illustrative and not in a limiting sense.

I claim:

1. A radio shield can assembly, comprising a panel having an opening therethrough, a shield can having an open lower end projecting through the opening, and a pair of fastening devices disposed on opposite sides of the can retaining it in assembly in the opening, each of said fastening devices having a body portion lying alongside the can and projecting through the panel opening, the lower end of the body portion having a reverse bend portion clipped over the end of one side of the can, and a pair of panel engaging arms attached to the upper end of the body portion, said arms lying in substantially the same plane as the body portion and extending downwardly through the panel opening alongside the body in spaced relation thereto, said arms being flexible toward and away from the body portion and having shoulders disposed on the outer edges disposed in snapping engagement in the panel opening.

2. A shield can assembly as set forth in claim 1 in which the legs of the fastener are attached to the upper end of the body by U-shaped portions projecting outwardly from the plane of the body portion to facilitate lateral flexing of the legs for snapping engagement with the panel opening.

References Cited in the file of this patent

UNITED STATES PATENTS

| | | |
|---|---|---|
| 2,531,911 | Johnson | Nov. 28, 1950 |
| 2,639,311 | Cook | May 19, 1953 |
| 2,678,798 | Churchill | May 18, 1954 |
| 2,770,435 | Becker | Nov. 13, 1956 |